US010482635B2

(12) United States Patent
McElwee et al.

(10) Patent No.: US 10,482,635 B2
(45) Date of Patent: Nov. 19, 2019

(54) CHART LABELING SYSTEM

(71) Applicant: ADP, LLC, Roseland, NJ (US)

(72) Inventors: Timothy James McElwee, Metuchen, NJ (US); Matthew Paul Herman, Hoboken, NJ (US)

(73) Assignee: ADP, LLC, Roseland, NJ (US)

( * ) Notice: Subject to any disclaimer, the term of this patent is extended or adjusted under 35 U.S.C. 154(b) by 395 days.

(21) Appl. No.: 14/499,564

(22) Filed: Sep. 29, 2014

(65) Prior Publication Data

US 2016/0092403 A1 Mar. 31, 2016

(51) Int. Cl.
*G06F 3/0481* (2013.01)
*G06T 11/20* (2006.01)

(52) U.S. Cl.
CPC .......... *G06T 11/206* (2013.01); *G06F 3/0481* (2013.01)

(58) Field of Classification Search
CPC ................... G06T 11/206; G06F 17/21; G06F 17/211-212; G06F 17/24; G06F 17/243; G06F 3/0481-0489
See application file for complete search history.

(56) References Cited

U.S. PATENT DOCUMENTS

| | | | | |
|---|---|---|---|---|
| 5,428,733 A * | 6/1995 | Carr | G06T 11/00 | 345/660 |
| 5,442,741 A * | 8/1995 | Hughes | G06T 11/206 | 345/440 |
| 5,917,499 A * | 6/1999 | Jancke | G06T 11/206 | 345/440 |
| 6,091,424 A * | 7/2000 | Madden | G06T 11/206 | 345/619 |
| 6,154,219 A * | 11/2000 | Wiley | G06T 11/60 | 345/581 |
| 6,320,577 B1 * | 11/2001 | Alexander | G01R 13/02 | 345/440 |
| 6,665,840 B1 * | 12/2003 | Wiley | G06T 11/203 | 345/587 |
| 6,972,762 B2 * | 12/2005 | Ben-Tovim | G06T 11/206 | 345/440 |

(Continued)

FOREIGN PATENT DOCUMENTS

EP 1647896 A2 4/2006

OTHER PUBLICATIONS

StackOverflow.com discussion titled "D3 put arc labels in a Pie Chart if there is enough space", published in relied-upon form on Feb. 20, 2014, 3 pages. Retrieved from http://stackoverflow.com/questions/19792552/d3-put-arc-labels-in-a-pie-chart-if-there-is-enough-space.*

(Continued)

*Primary Examiner* — Steven B Theriault
(74) *Attorney, Agent, or Firm* — Yee & Associates, P.C.

(57) ABSTRACT

A method and apparatus for graphically displaying data is presented. A computer system selects a section from a group of sections in a circular chart for the data that is to be graphically displayed on a display system. The computer system identifies a largest size for a polygon that will fit in the section of the circular chart. The computer system also identifies text for the section. Further, the computer system displays the circular chart with the text in the section on a display system when the text fits within the polygon in the section. Graphically displaying the data with the text in the circular chart enables a desired level of comprehension of the data.

17 Claims, 14 Drawing Sheets

(56) References Cited

U.S. PATENT DOCUMENTS

| | | | | |
|---|---|---|---|---|
| 7,131,060 | B1 * | 10/2006 | Azuma | G06T 11/60 715/260 |
| 7,146,374 | B1 * | 12/2006 | Molesky | G06T 11/206 |
| 7,292,244 | B2 * | 11/2007 | Vafiadis | G06F 17/24 345/440 |
| 7,716,578 | B2 * | 5/2010 | Theophil | G06T 11/206 715/217 |
| 8,237,745 | B1 * | 8/2012 | Cornell | G01C 21/3673 345/660 |
| 8,482,582 | B2 * | 7/2013 | Gelber | G09B 29/10 345/629 |
| 8,488,183 | B2 * | 7/2013 | Pinkerton | G06T 11/60 358/1.18 |
| 8,570,326 | B2 * | 10/2013 | Gorev | G06T 11/206 345/440 |
| 8,749,588 | B2 * | 6/2014 | Herman | G06T 19/00 345/629 |
| 9,142,050 | B2 * | 9/2015 | Jain | G06T 11/206 |
| 9,361,719 | B1 * | 6/2016 | Demura | G01C 21/32 |
| 9,396,697 | B2 * | 7/2016 | Adlers | G06T 3/60 |
| 10,204,431 | B1 * | 2/2019 | Hou | G06T 11/203 |
| 2002/0101450 | A1 * | 8/2002 | Magendanz | G06F 9/451 715/764 |
| 2003/0026500 | A1 * | 2/2003 | Hersch | B41M 3/14 382/293 |
| 2003/0234782 | A1 * | 12/2003 | Terentyev | G06T 19/00 345/421 |
| 2004/0032417 | A1 * | 2/2004 | Chen | G06T 17/05 345/636 |
| 2004/0083425 | A1 * | 4/2004 | Dorwart | G06F 17/246 715/211 |
| 2004/0252137 | A1 * | 12/2004 | Gelber | G09B 29/10 345/629 |
| 2005/0062763 | A1 * | 3/2005 | Keim | G09B 29/00 345/647 |
| 2005/0093866 | A1 * | 5/2005 | Ebert | G06Q 10/06 345/440 |
| 2006/0058949 | A1 * | 3/2006 | Fogel | G01C 21/32 345/629 |
| 2006/0059414 | A1 * | 3/2006 | Cory | G06T 11/206 715/215 |
| 2006/0082594 | A1 * | 4/2006 | Vafiadis | G06F 17/24 345/629 |
| 2006/0200759 | A1 * | 9/2006 | Agrawala | G06F 17/211 715/209 |
| 2008/0072165 | A1 * | 3/2008 | Theophil | G06K 9/6253 715/764 |
| 2008/0307369 | A1 * | 12/2008 | Liu | G06T 11/206 715/855 |
| 2010/0085383 | A1 * | 4/2010 | Cohen | G06T 3/40 345/660 |
| 2010/0253686 | A1 * | 10/2010 | Alsbury | G06T 11/206 345/440 |
| 2011/0063328 | A1 * | 3/2011 | Herman | G06T 19/00 345/681 |
| 2012/0245841 | A1 * | 9/2012 | Spindler | G01C 21/32 701/428 |
| 2012/0306914 | A1 * | 12/2012 | Sepulveda | G06T 15/50 345/629 |
| 2013/0038628 | A1 * | 2/2013 | Look | G06T 7/004 345/622 |
| 2013/0091413 | A1 * | 4/2013 | Doan | G06F 17/24 715/227 |
| 2013/0268874 | A1 * | 10/2013 | Pearson | G06F 3/0481 715/767 |
| 2013/0271493 | A1 * | 10/2013 | Shiroor | G09G 5/00 345/635 |
| 2013/0314441 | A1 * | 11/2013 | Grasset | G06T 1/00 345/633 |
| 2013/0332447 | A1 * | 12/2013 | Bernier | G06F 16/29 707/713 |
| 2014/0078182 | A1 * | 3/2014 | Utsunomiya | G09G 5/37 345/666 |
| 2014/0132609 | A1 * | 5/2014 | Garg | G06F 16/904 345/440 |
| 2014/0362085 | A1 * | 12/2014 | Jain | G06T 11/206 345/440 |
| 2015/0379161 | A1 * | 12/2015 | Jones | G06F 17/50 703/1 |

OTHER PUBLICATIONS

Wikipedia.com entry for "callout" as captured by Internet archive Wayback Machine on Sep. 22, 2014; 2 pages. Retrieved from http://web.archive.org/web/20140922173811/http://en.wikipedia.org/wiki/Callout.*

"Present your data in a doughnut chart—Excel," Microsoft Corporation, copyright 2014, accessed Sep. 23, 2014, 6 pages. http://office.microsoft.com/en-us/excel-help/present-your-data-in-a-doughnut-chart-HA010215572.aspx.

Barnes et al., "Calc Guide: Chapter 3—Creating Charts and Graphs," OpenOffice.org, Apr. 2011, accessed Sep. 23, 2014, 32 pages. https://wiki.openoffice.org/w/images/d/d0/03030G33-ChartsAndGraphs.pdf.

"SAS/GRAPH(R) 9.3," SAS Institute, Inc., Third Edition, Aug. 2012, accessed Sep. 23, 2014, pp. 1155-1175. http://support.sas.com/documentation/cdl/en/graphref/65389/HTML/defaultlviewer.htm#p13h0w5vhbfvern1a23b0f3lvfyh.htm.

* cited by examiner

1100

```
function processLabelAngle (text) {
        text.each(function() {

1102       var textItem = d3.select(this);
           var textWidth = textItem.node().getComputedTextLength();
           var arcBox = $(this).prev();
           var arcBoxWidth = parseFloat(arcBox.attr('data-max-width'));
           var arcBoxVert = parseFloat(arcBox.attr('data-max-vert'));
           var labelAngle = parseFloat(arcBox.attr('data-label-angle'));

1104       var bufferForColor = 30;

1106       if ((labelAngle>=65 && labelAngle<=115) || (labelAngle>=245 && labelAngle<=295)){
             // console.info("In Horizontal sectors");
             textItem.attr('data-angle-width', Math.max(arcBoxVert-bufferForColor,-5));
             textItem.attr('data-angle-height', arcBoxWidth);
             textItem.attr('data-label-angle', labelAngle);
           } else {
             // console.info("In non-horizontal sectors");
             textItem.attr('data-angle-width', Math.max(arcBoxWidth-bufferForColor,-5));
             textItem.attr('data-angle-height', Math.max(arcBoxVert-bufferForColor,-5));
             textItem.attr('data-label-angle', labelAngle);
           }
        });
}
```

```
function renderSlices(pie, arc) {
  var key = function(d){ return d.data.name; };
  var colorScale = chartConfig[ codename ].colorScale;
  var toolTipAttr;
  var officiousScale = d3.scale.ordinal()
    .range(colorScale);
  var slices = pieG.selectAll('path.arc')
    .data(pie(chartData.details), key)
    .enter().append('g')
      .attr('class', 'slice')
      .attr('data-slice-name', function(d,i){
        toolTipAttr = (d.data.name).replace(/\s+/g, ''); return toolTipAttr; })
      .append('path')
      .attr('cursor', (isClickable? 'pointer': 'default'))
      .attr('class', function(d,i){ return 'arc '+colorScale[i]; })
      .attr("data-centroid", function(d){ return arc.centroid(d); })
      .attr("data-max-width", function(d){
        var startAngle = d.startAngle * (180/Math.PI);
        var endAngle = d.endAngle * (180/Math.PI);
        var maxVertWidth = ((radius * 0.8) - (radius * 0.35));
        var labelRadius =  radius - (maxVertWidth/2);
        var theta = (endAngle - startAngle);

        if( theta >=64){ theta = 64  * Math.PI/180; }
        else{ theta = theta * Math.PI/180; }

        var maxHorizontalWidth = Math.sqrt(Math.pow(labelRadius, 2) +
                                  Math.pow(labelRadius, 2) -
                                  (2 * (labelRadius * labelRadius * Math.cos( theta ))));
        return maxHorizontalWidth; })
```

1202

```
  slices.each(function (d) {
    var node = d3.select(this);
    node.call(renderLabels, {"d": d, "arc": arc});
  });
}
```

```
function renderLabelWrap(text) {
        text.each(function() {
         var text = d3.select(this),
            width = text.attr('data-angle-width'),
            height = text.attr('data-angle-height'),
            labelAngle = text.attr('data-label-angle'),
            starting = text.text().trim(),
            words = starting.split(/\s+/).reverse(),
            word,
            line = [],
            lineNumber = 0,
            lineHeight = 1.2, // ems
            y = text.attr("y"),
            dy = parseFloat(text.attr("dy")),
            tspan = text.text(null).append("tspan").attr("x", 0).attr("y", y).
                  attr("dy", dy + "em");
         while (word = words.pop()) {
          line.push(word);
          tspan.text(line.join(" "));
          if (tspan.node().getComputedTextLength() > width ||
                tspan.node().getComputedTextLength() > height) {
            line.pop();
            tspan.text(line.join(" "));
            line = [word];
            if(lineNumber<1){
              tspan = text.append("tspan").attr("x", 0).attr("y", y). attr("dy",
                  ++lineNumber * lineHeight + dy + "em").text(word);
              try {
               var bbox = this.getBBox();
               var getRect = this.getBoundingClientRect();
               if ( bbox.height > height  || bbox.width > width) {
                d3.select(this).attr('class', 'label-hide');
               }
              } catch (e) {
               d3.select(this).attr('class', 'label-hide');
              }
            } else {
              tspan = text.append("tspan").attr("x", 0).attr("y", y).attr("dy",
                  ++lineNumber * lineHeight+ 14).text(word);
              try {
               var bbox = this.getBBox();
               var getRect = this.getBoundingClientRect();
               if ( bbox.height > height  || bbox.width > width ||
                  bbox.height > width || bbox.width > height) {
                d3.select(this).attr('class', 'label-hide');
               }
              } catch (e) {
               d3.select(this).attr('class', 'label-hide');
              }
            }
          }
         }
        });
      }
```

CHART LABELING SYSTEM

BACKGROUND INFORMATION

1. Field

The present disclosure relates generally to data processing systems, and in particular, to graphically displaying data in a graphical user interface. Still more particularly, the present disclosure relates to a method and apparatus for generating labels for charts displayed graphically in a graphical user interface.

2. Background

Information from spreadsheets, databases, and other sources may be displayed graphically in a number of different ways. For example, bar graphs, line graphs, circular charts, and other types of charts or graphs may be used to provide a graphical representation of the information.

Circular charts include pie charts and data charts. These types of circular charts are divided into sections. Each section typically illustrates a numerical proportion to the quantity represented by the section. In particular, the arc length of each section represents the quantity as a proportion relative to other quantities represented by arc lengths in the circular chart.

Presenting the circular charts as accurately as possible and conveying information as efficiently as possible is desirable. For example, labels are often used in circular charts to convey information about what each section represents. A label contains text providing information about a section in the circular chart. Depending on the number of sections, the text for the labels, as well as other factors, may make placing the text in the labels into the different sections more challenging than desired.

For example, the number of words in the text for a label may be greater than that which will fit within a section of a circular chart. Having a line of text in a label from one section cross over into another section may lead to confusion in graphically conveying the data represented in the different sections of the circular chart. In other words, the graphical conveyance of information through the circular chart may not be as clear when a label placed in one section also extends into another section in the circular chart. For example, the text in one label may intersect with the text in another label or may be too close to the text in another label. As a result, graphically conveying what each section represents in the circular chart becomes confusing.

One solution to this issue involves abbreviating words used in the text for the labels. Abbreviations, however, may be unclear and lead to confusion in understanding the data being graphically represented by the circular chart. A legend may be used to define abbreviations. The legend, however, may be more complex than desired or may not provide the desired aesthetics for the graphical representation for the information.

Another solution involves using labels that are located outside of the circular chart. Lines, arrows, or other indicators may be used to associate the labels with different sections of the circular chart. These types of labels, however, may not provide the desired aesthetics for the graphical representation of the information. Additionally, the use of labels outside of the sections also may lead to increased difficulty in understanding the chart with the increased clutter of having labels outside of the different sections.

Therefore, it would be desirable to have a method and apparatus that take into account at least some of the issues discussed above, as well as other possible issues. For example, it would be desirable to have a method and apparatus that generate labels for display within sections of a circular chart that avoid issues such as text for one section extending into another section while providing a desired aesthetic graphical display of the data.

SUMMARY

In one illustrative embodiment, a method for graphically displaying data is presented. A computer system selects a section from a group of sections in a circular chart for the data that is to be graphically displayed on a display system. The computer system identifies a largest size for a polygon that will fit in the section of the circular chart. The computer system also identifies text for the section. Further, the computer system displays the circular chart with the text in the section on a display system when the text fits within the polygon in the section. Graphically displaying the data with the text in the circular chart enables a desired level of comprehension of the data.

In another illustrative embodiment, a graphical display system comprises a display system and a chart generator in a computer system in communication with the display system. The chart generator selects a section from a group of sections in a circular chart for data that is to be graphically displayed on the display system. The chart generator also identifies a largest size for a polygon that will fit in the section of the circular chart. Further, the chart generator identifies text for the section. Still further, the chart generator displays the circular chart with the text in the section on the display system when the text fits within the polygon in the section. Graphically displaying the data with the text in the circular chart enables a desired level of comprehension of the data.

In yet another illustrative embodiment, a computer program product comprises a computer readable storage media. The computer program product also comprises a first program code, a second program code, a third program code, and a fourth program code that are stored on the computer readable storage media. The first program code selects a section from a group of sections in a circular chart for data that is to be graphically displayed on a display system. The second program code identifies a largest size for a polygon that will fit in the section of the circular chart. The third program code identifies text for the section. The fourth program code displays the circular chart with the text in the section on the display system when the text fits within the polygon in the section. Graphically displaying the data with the text in the circular chart enables a desired level of comprehension of the data.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 11 is an illustration of program code for displaying text in a section of a circular chart based on the orientation of the section in accordance with an illustrative embodiment;

FIG. 12 is an illustration of program code for displaying circular charts in accordance with an illustrative embodiment;

FIG. 13 is an illustration of program code for displaying text in a section for a circular chart in accordance with an illustrative embodiment.

DETAILED DESCRIPTION

The illustrative embodiments recognize and take into account one or more different considerations. For example, the illustrative embodiments recognize and take into account that currently used techniques for generating labels with text in charts may not be as clear as possible to convey information to a person viewing the chart. The illustrative embodiments recognize and take into account that current techniques for displaying text in circular charts often have an undesirable trade-off between the aesthetics of the chart and conveying the information in a desired manner. For example, the illustrative embodiments recognize and take into account that the use of abbreviations, codes, or other shorthand techniques for labels in a circular chart does not convey information as quickly and clearly as desired. Further, labels placed on the outside of circular charts often do not have a desired level of aesthetics.

Thus, the illustrative embodiments provide a method and apparatus for graphically displaying data. In one illustrative example, a computer system selects a section from a group of sections in a circular chart for the data that is to be graphically displayed on a display system. The computer system identifies the largest size for a polygon that will fit in the section of the circular chart and text for the section. The computer system displays the circular chart with the text in the section on a display system when the text fits within the polygon in the section, wherein the graphical display of the data with the text in the circular chart enables a desired level of comprehension of the data.

This process may be performed for each section in which text is to be displayed in the circular chart. In this manner, data may be graphically displayed in circular charts with a greater amount of desired aesthetics which may enable an increased comprehension of the data as compared to currently used techniques for displaying text in sections of circular charts.

Figure 1:
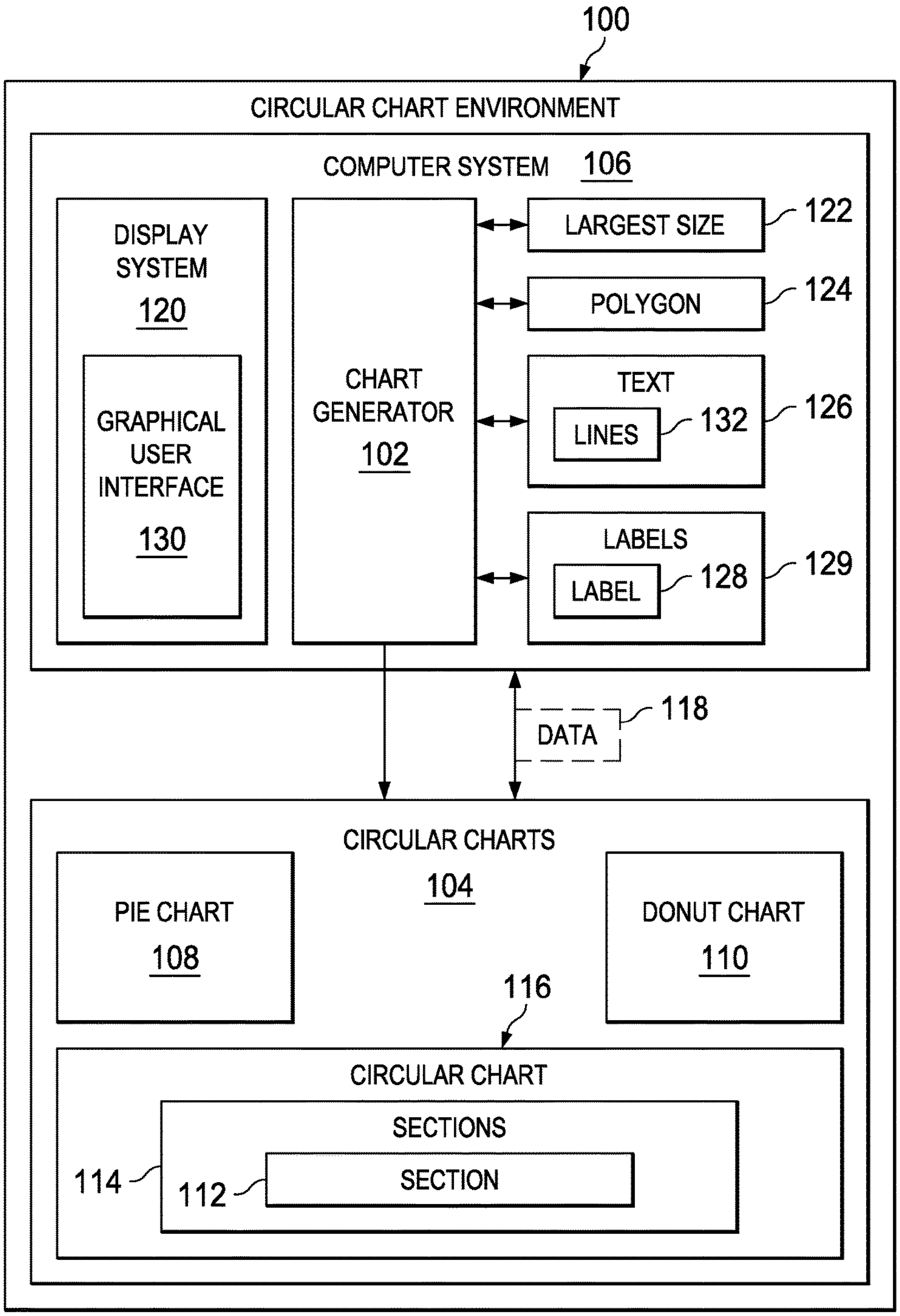
FIG. 1 is an illustration of a block diagram of a circular chart environment in accordance with an illustrative embodiment.

With reference now to the figures, and in particular, to FIG. 1, an illustration of a block diagram of a circular chart environment is depicted in accordance with an illustrative embodiment. In circular chart environment 100, chart generator 102 generates circular charts 104.

As depicted, chart generator 102 may be implemented in software, hardware, firmware, or a combination thereof. When software is used, the operations performed by chart generator 102 may be implemented in program code configured to run on hardware, such as a processor unit. When firmware is used, the operations performed by chart generator 102 may be implemented in program code and data and stored in persistent memory to run on a processor unit. When hardware is employed, the hardware may include circuits that operate to perform the operations in chart generator 102.

In this illustrative example, chart generator 102 may be implemented in computer system 106. Computer system 106 may be comprised of one or more computers or other data processing devices. When more than one data processing device is present, those devices may communicate with each other through a communications media such as a network.

In the illustrative example, circular charts 104 may include at least one of pie chart 108, donut chart 110, or some other suitable type of chart. As depicted, pie chart 108 may be considered as a donut chart with an inner radius of zero.

As used herein, the phrase "at least one of," when used with a list of items, means different combinations of one or more of the listed items may be used and only one of each item in the list may be needed. In other words, at least one of means any combination of items and number of items may be used from the list but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

As depicted, chart generator 102 generates circular charts 104 with at least one of a desired level of aesthetics or a desired level of comprehension to a person viewing circular charts 104. In the illustrative example, chart generator 102 selects section 112 from a group of sections 114 in circular chart 116 in circular charts 104 for data 118 that is to be graphically displayed on display system 120 in computer system 106. "A group of," as used herein with reference to items, means one or more items. For example, a group of sections 114 is one or more sections 114.

In the illustrative example, display system 120 may be one or more display devices. Display system 120 may be located in a data processing device in computer system 106 selected from one of a work station, a tablet computer, a mobile phone, a laptop computer, or some other suitable data processing device.

Chart generator 102 identifies largest size 122 for polygon 124 that will fit in section 112 of circular chart 116. In the illustrative example, polygon 124 may take different forms. For example, polygon 124 may be selected from one of a square, a rectangle, a trapezoid, a quadrilateral, a pentagon, a hexagon, or some other suitable polygon.

Chart generator 102 identifies text 126 for section 112. In this illustrative example, text 126 for section 112 is label 128 in group of labels 129 for section 112 in a group of sections 114. Chart generator 102 displays circular chart 116 with text 126 in section 112 in graphical user interface 130 on display system 120 when text 126 fits within polygon 124 in section 112.

In particular, chart generator 102 sends information about circular chart 116 to display system 120. Display system 120 receives this information and display circular chart 116 in graphical user interface 130 as a graphical display of data 118 in a manner that has increased comprehension and aesthetics for data 118 as compared to currently used techniques for displaying circular charts. As a result, circular chart 116 provides presentation data 118 for circular chart 116 in graphical user interface 130 when display system 120 is altered for the presentation of circular chart 116.

In the illustrative example, text 126 may be formatted into a number of lines 132. The number of lines 132 that may be used may be based on aesthetics. For example, the number of lines 132 of text 126 for section 112 may be one line, two lines, three lines, or some other suitable number of lines depending on the implementation.

In this manner, graphically displaying data 118 with text 126 in circular chart 116 enables a desired level of comprehension of data 118. Additionally, a desired level of aesthetics for circular chart 116 also may be achieved in addition to a desired level of comprehension of data 118. In this manner, chart generator 102 may operate as a chart labeling system to place text 126 into sections 114 in a manner that provides at least one of a desired level of aesthetics or a desired level of information conveyance of data 118 in circular charts 104 that are displayed in display system 120.

As a result, computer system 106 operates as a special purpose computer system in which chart generator 102 enables displaying circular charts 104 with at least one of a greater level of aesthetics or a greater level of comprehension as compared to other computers that do not have chart generator 102. In particular, chart generator 102 alters display system 122 and displays circular chart 116 with text 126.

Also, chart generator 102 enables a higher level of aesthetics in displaying circular charts 104 with a desired level of comprehension of data 118 as compared to currently used computers for generating charts. In this manner, chart generator 102 operates in computer system 106 and alters display system 120 to provide a presentation of data 118 in circular chart 116.

The illustration of circular chart environment 100 and the different components in circular chart environment 100 in FIG. 1 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, circular charts 104 may be present in ways other than in graphical user interface 130 in display system 120. For example, circular charts 104 may be printed on paper, transparencies, or on other suitable media. As another example, chart generator 102 may also identify the amount and the sizes of sections 114 in circular charts 104 from data 118 for circular chart 116.

Figure 2:
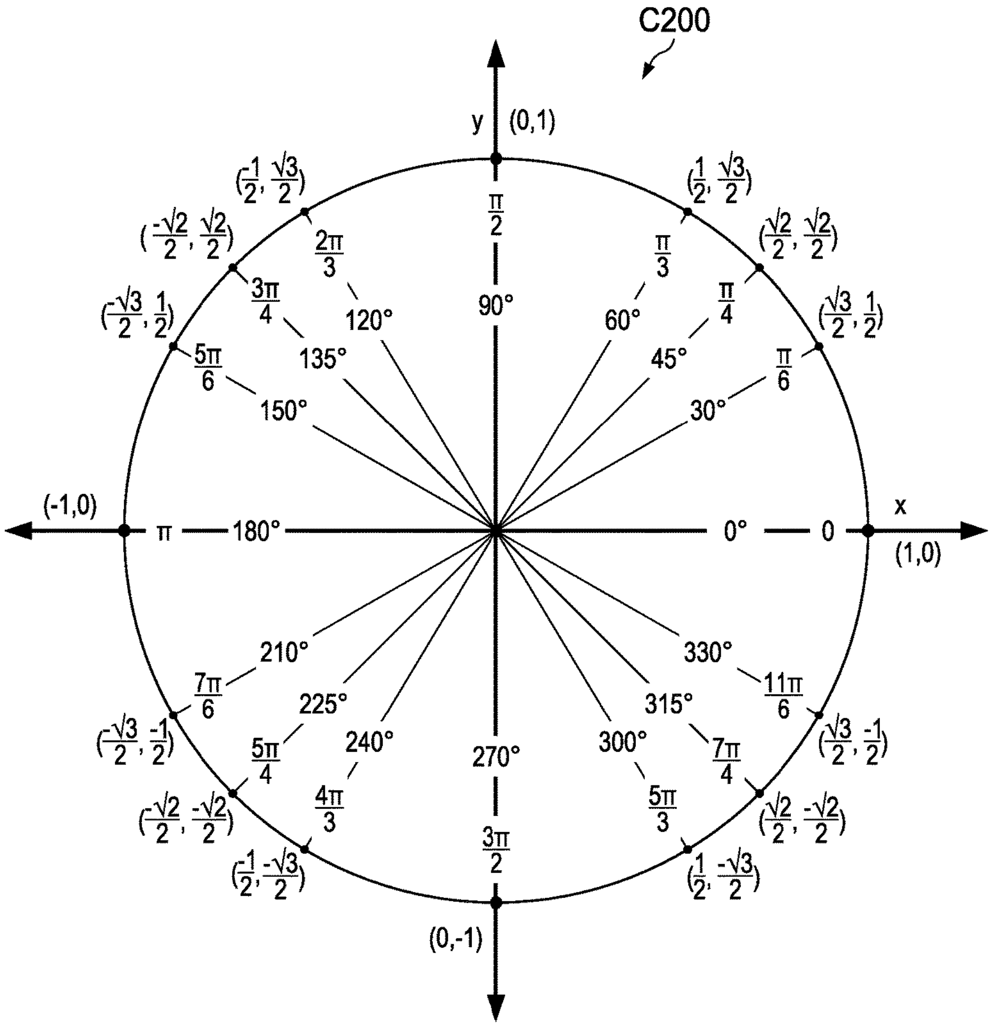
FIG. 2 is an illustration of a unit circle in accordance with an illustrative embodiment.

With reference next to FIG. 2, an illustration of a unit circle is depicted in accordance with an illustrative embodiment. As depicted, unit circle 200 is an example of circular chart 116 in FIG. 1. In this illustrative example, unit circle 200 is not an actual display of a circular chart. As depicted, unit circle 200 shows information about a circular chart.

In this illustrative example, unit circle 200 has a number of possible angles that may be used to define sections of a circular chart. As depicted, the numbers of possible angles are between zero and three hundred and sixty degrees about the center of unit circle 200. In the illustrative example, unit circle 200 is shown on a two-dimensional graph having an x-axis and a y-axis. The center of unit circle 200 is at the origin of the graph.

As depicted, unit circle 200 has a radius of 1. As also depicted, the locations of the points about the unit circle for the number of possible angles are shown on unit circle 200. The locations of these points on the graph are calculated using the following trigonometric formula: the cosine of the angle equals x and the sine of the angle equals y.

In these illustrative examples, information about a circular chart can be calculated using trigonometric formulas. For example, the largest size for a polygon that will fit in a section of a circular chart can be determined using trigonometric formulas.

As depicted, the largest size for a polygon that will fit in a section of unit circle 200 may be based on the orientation of the section. Orientation of a section is the general direction of the section indicated by the ends of the section formed by the angles about unit circle 200. For example, the largest size for a polygon that would fit in a section defined by 150 degrees and 210 degrees about unit circle 200 may not fit in another section defined by 60 degrees and 120 degrees about unit circle 200.

Figure 3:
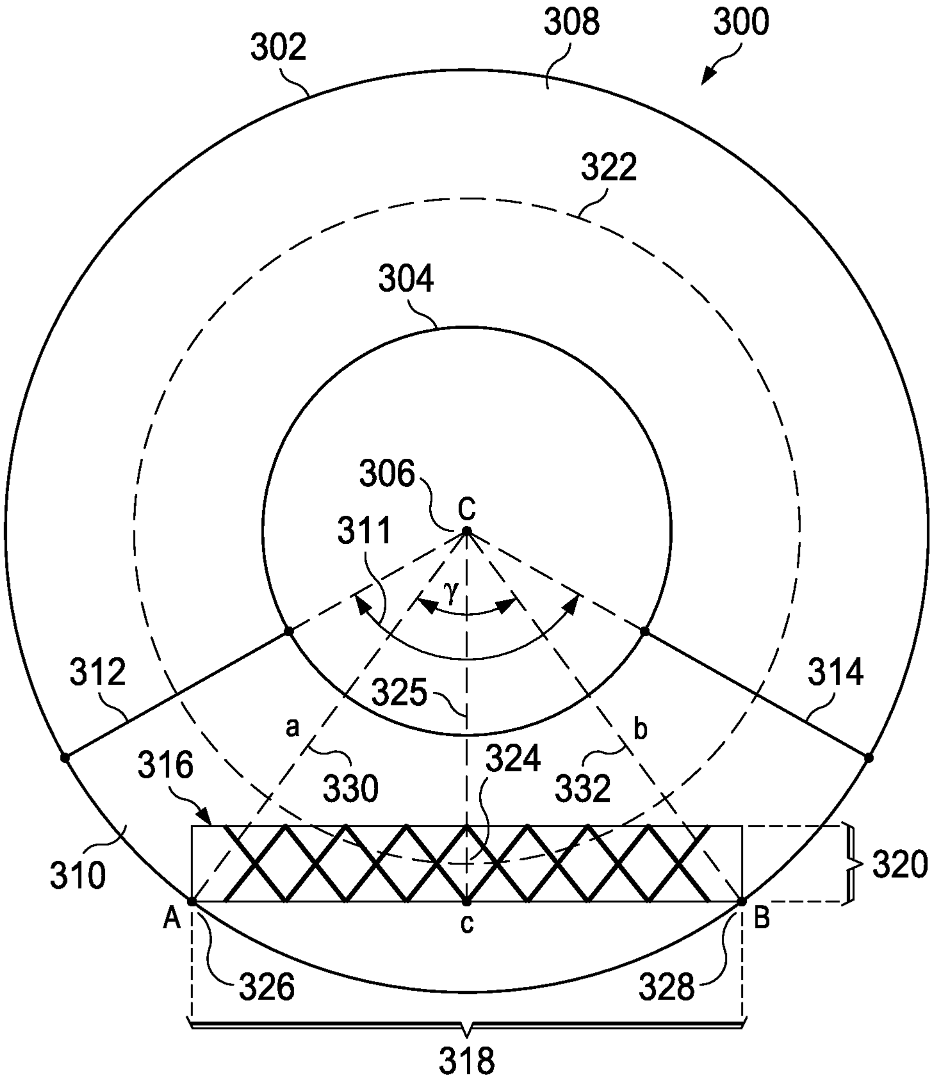
FIG. 3 is an illustration of a donut chart in accordance with an illustrative embodiment.

Turning to FIG. 3, an illustration of a donut chart is depicted in accordance with an illustrative embodiment. As depicted, donut chart 300 is an example of an implementation of donut chart 110 shown in block diagram form in FIG. 1. In this illustrative example, donut chart 300 is shown with solid lines. Information about how donut chart 300 is displayed is shown with dashed lines.

In this illustrative example, donut chart 300 has outer radius circle 302 and inner radius circle 304. As depicted, donut chart 300 is displayed around center 306 of donut chart 300. In this illustrative example, donut chart 300 includes upper section 308 and lower section 310. As depicted, lower section 310 has number of degrees 311 formed by angle 312 and angle 314. In other words, upper section 308 and lower section 310 of donut chart 300 are formed by angle 312 and angle 314.

As depicted, donut chart 300 includes rectangle 316. Rectangle 316 is an example of polygon 124 in FIG. 1. In this illustrative example, rectangle 316 includes a single line of text that may be used to describe lower section 310. As depicted, rectangle 316 has width 318 and height 320. In this illustrative example, height 320 of rectangle 316 is calculated based on the height required to display the line of text.

The height required to display a line of text may be determined using well-known interfaces of a display system. The height required to display a line of text may also be selected by an operator or by some other suitable method.

In this illustrative example, circle 322 is halfway between outer radius circle 302 and inner radius circle 304. Circle 322 is shown with dashed lines in FIG. 3 to show how centroid 324 for lower section 310 is identified.

In this illustrative example, angle 325 is halfway between angle 312 and angle 314. Thus, as shown, centroid 324 for lower section 310 is the point where angle 325 intersects with circle 322.

In the illustrative example, centroid 324 for lower section 310 is used as the center of rectangle 316 in lower section 310. Other locations for the center of rectangle 316 may also be selected. In this illustrative example, centroid 324 for lower section 310 is used as the center of rectangle 316 in lower section 310 for aesthetic reasons. Rectangle 316 is horizontal in this example for aesthetic reasons.

As depicted, width 318 is the largest width for rectangle 316. If width 318 for rectangle 316 was longer than shown in FIG. 3, rectangle 316 would extend beyond section 310. In this illustrative example, width 318 for rectangle 316 does not extend beyond section 310 for aesthetic reasons.

In this illustrative example, width 318 for rectangle 316 is identified using trigonometric formulas. For example, using trigonometric formulas, chart generator 102 in FIG. 1 can identify intersecting point 326 for angle 330 and intersecting point 328 for angle 332 based on height 320 and centroid 324 for rectangle 316.

In the illustrative example, width 318 for rectangle 316 is the distance between intersecting point 326 and intersecting point 328. When angle 330 and angle 332 are known, width 318 can also be identified using the law of cosines.

As depicted, other portions of rectangle 316 may be the intersecting points of rectangle 316 when the section in which rectangle 316 is located is smaller. For example, if angle 314 was equal to angle 332, then width 318 for rectangle 316 would be reduced to ensure rectangle 316 did not extend beyond section 310. In this example, the top line of rectangle 316 would hit angle 314 before the bottom line hit outer radius 302.

Similarly, when section 310 is pointing generally in other directions, other portions of rectangle 316 may intersect with other portions of section 310. As depicted, chart generator 102 in FIG. 1 identifies the largest width 318 for rectangle 316 that can be horizontal at centroid 324 within section 310. In this illustrative example, centroid 324 is also a centroid for rectangle 316.

In the illustrative example, center 306, rectangle 316, circle 322, angle 325, angle 312, and angle 314 are not features actually displayed as part of donut chart 300. These features are shown in this illustration to more clearly describe how chart generator 102 generates a rectangle displaying text within donut chart 300. These features are not displayed as part of donut chart 300 to a viewer of donut chart 300.

Figure 4:
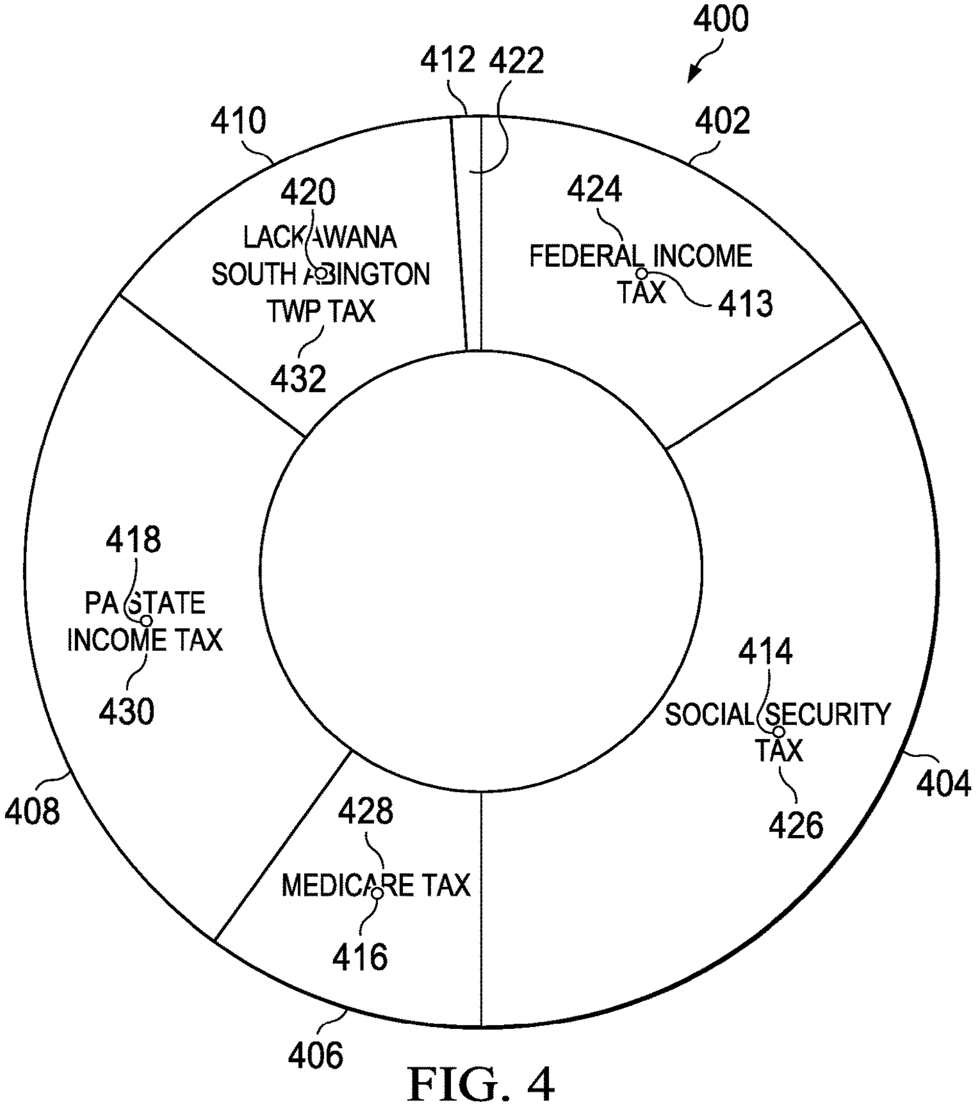
FIG. 4 is an illustration of a donut chart in accordance with an illustrative embodiment.

Turning next to FIG. 4, an illustration of a donut chart is depicted in accordance with an illustrative embodiment. In this example, donut chart 400 is an example of donut chart 110 shown in block form in FIG. 1.

As depicted, donut chart 400 is generated by chart generator 102 in FIG. 1. Donut chart has 6 sections in this illustrative example: section 402, section 404, section 406, section 408, section 410, and section 412.

Section 402 has centroid 413, section 404 has centroid 414, section 406 has centroid 416, section 408 has centroid 418, section 410 has centroid 420, and section 412 has centroid 422. The centroids shown in this figure and in the other figures are not actually displayed in charts to a person viewing the charts, but they are shown here to illustrate how text is displayed in a chart, such as donut chart 400.

For example, text 424 is displayed in section 402 with text 424 centered on centroid 412. Text 426 is displayed in section 404 with text 426 centered on centroid 414. Also, text 428 is displayed in section 406 with text 428 centered on centroid 416. Text 430 is displayed in section 408 with text 430 centered on centroid 418. Text 432 is displayed in section 410 with text 432 centered on centroid 420. In the illustrative example, section 412 does not have text. The text for section 412 has been identified as being undisplayable within section 412. The text in the sections may be referred to as labels for these sections.

Figure 5:
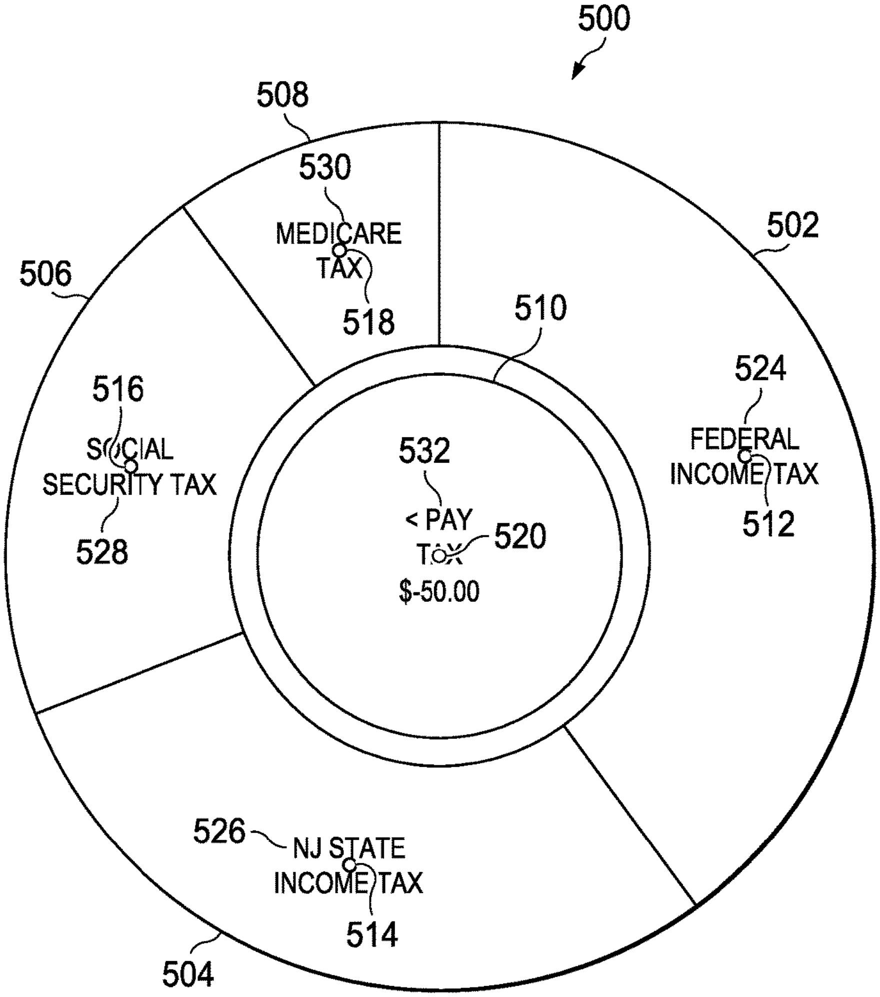
FIG. 5 is an illustration of a donut chart in accordance with an illustrative embodiment.

With reference next to FIG. 5, an illustration of a donut chart is depicted in accordance with an illustrative embodiment. In this example, donut chart 500 is an example of donut chart 110 shown in block form in FIG. 1.

In this illustrative example, donut chart 500 is generated by chart generator 102 in FIG. 1. As depicted, donut chart 500 has 5 sections: section 502, section 504, section 506, section 508, and section 510. In the illustrative example, all of the sections in donut chart 500 have text.

As depicted, section 502 has centroid 512; section 504 has centroid 514; section 506 has centroid 516; section 508 has centroid 518; and section 510 has centroid 520. Again, the centroids shown in this figure are not actually displayed in donut chart 500 to a person viewing donut chart 500, but they are shown here to illustrate how text is displayed in donut chart 400.

For example, text 524 is displayed in section 502 with text 524 centered on centroid 512. Text 526 is displayed in section 504 with text 526 centered on centroid 514, and text 528 is displayed in section 506 with text 528 centered on centroid 516. Text 530 is displayed in section 508 with text 530 centered on centroid 518. Text 532 is displayed in section 510 with text 532 centered on centroid 520.

Figure 6:
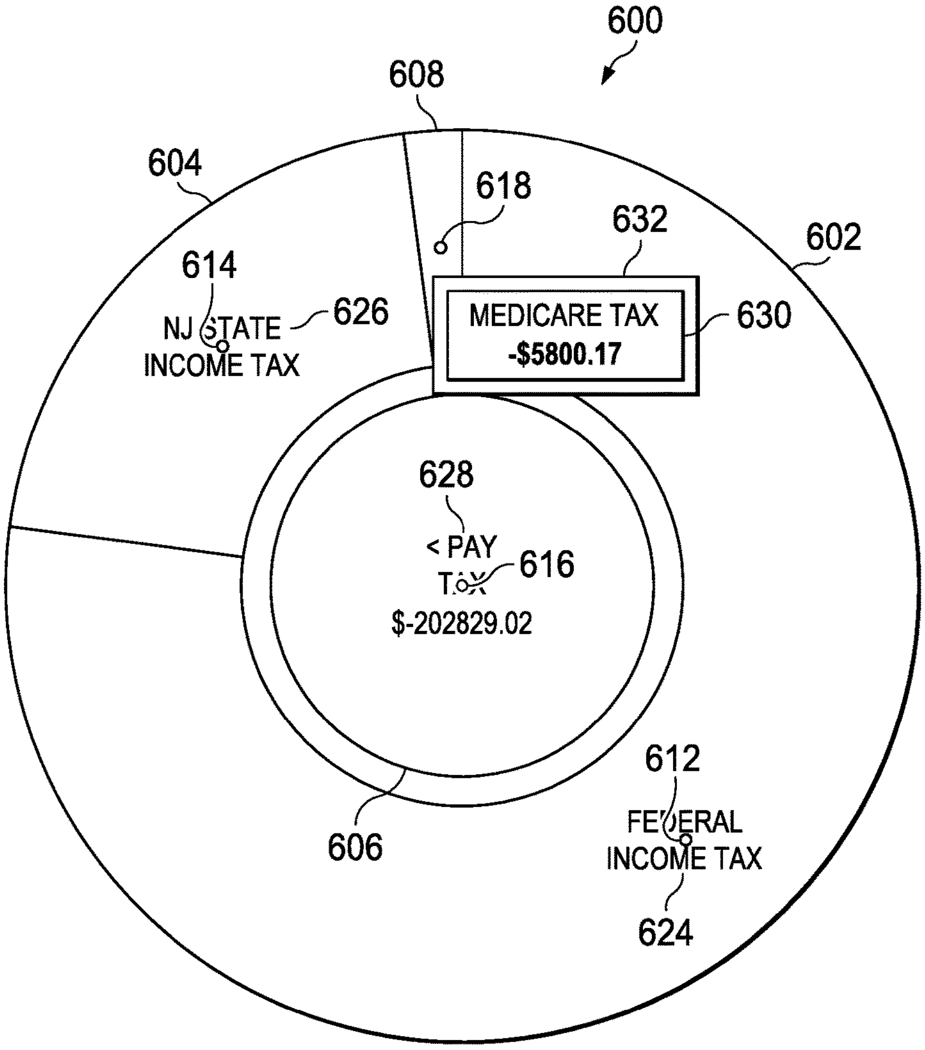
FIG. 6 is an illustration of a donut chart in accordance with an illustrative embodiment.

With reference next to FIG. 6, an illustration of a donut chart is depicted in accordance with an illustrative embodiment. In this figure, donut chart 600 is an example of donut chart 110 shown in block form in FIG. 1.

In this illustrative example, donut chart 600 is generated by chart generator 102 in FIG. 1. Donut chart 600 has 4 sections: section 602, section 604, section 606, and section 608. In the illustrative example, section 608 in donut chart 600 does not have text displayed within section 608.

As depicted, section 602 has centroid 612, section 604 has centroid 614, section 606 has centroid 616, and section 608 has centroid 618. The centroids in this illustrative example are not actually displayed in donut chart 600 to a person viewing donut chart 600, but they are shown here to illustrate how text is displayed in donut chart 600.

In this illustrative example, text 624 is displayed in section 602 with text 624 centered on centroid 612. Text 626 is displayed in section 604 with text 626 centered on centroid 614, and text 628 is displayed in section 606 with text 628 centered on centroid 616.

Text 630 is displayed in association with section 608 in hover box 632. Hover box 632 is displayed when a pointer is moved over section 608.

Figure 7:
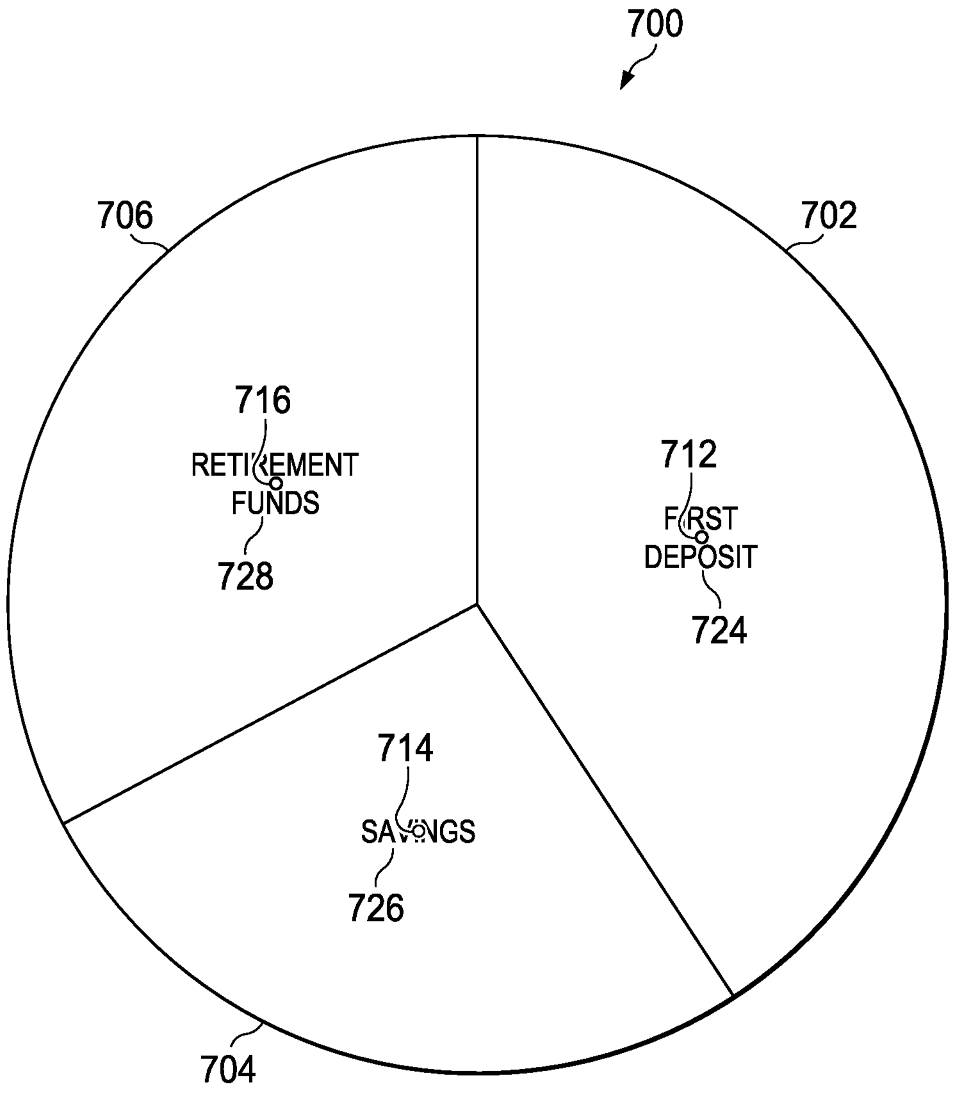
FIG. 7 is an illustration of a pie chart in accordance with an illustrative embodiment.

With reference next to FIG. 7, an illustration of a pie chart is depicted in accordance with an illustrative embodiment. In this example, pie chart 700 is an example of pie chart 108 shown in block form in FIG. 1.

As depicted, pie chart 700 is generated by chart generator 102 in FIG. 1. Pie chart 700 has 3 sections: section 702, section 704, and section 706.

As depicted, section 702 has centroid 712; section 704 has centroid 714; and section 706 has centroid 716. These centroids are not displayed in donut chart 700 to a person viewing donut chart 700, but they are shown here to demonstrate how text is displayed in donut chart 700.

As depicted, text 724 is displayed in section 702 with text 724 centered on centroid 712. Text 726 is displayed in section 704 with text 726 centered on centroid 714. Text 728 is displayed in section 706 with text 728 centered on centroid 716.

The illustrations of the circular charts in FIGS. 4-7 are not meant to limit the manner in which other illustrative examples may be implemented. For example, a call out or pop window may be used to display text 630 in place of hover box 632 in FIG. 6. As another example, a call out with text 630 may always be displayed rather than being displayed when a pointer is moved over section 608.

Figure 8:
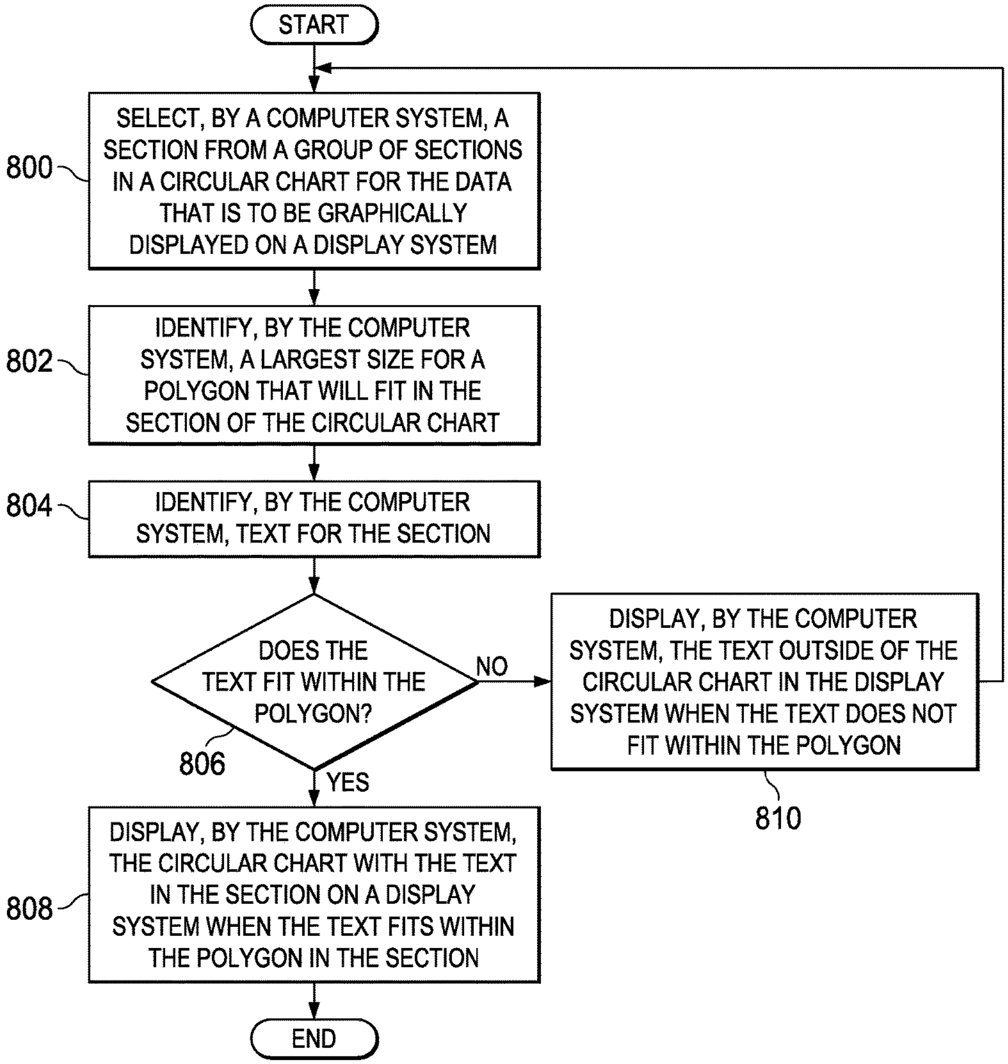
FIG. 8 is an illustration of a flowchart of a process for graphically displaying data in accordance with an illustrative embodiment.

With reference now to FIG. 8, an illustration of a flowchart of a process for graphically displaying data is depicted in accordance with an illustrative embodiment. The process illustrated in FIG. 8 may be implemented in circular chart environment 100 in FIG. 1. In particular, the process may be implemented in chart generator 102 to display data 118 in circular charts 104 on display system 120 in computer system 106.

The process begins by a computer system selecting a section from a group of sections in a circular chart for the data that is to be graphically displayed on a display system (operation 800). The computer system identifies a largest size for a polygon that will fit in the section of the circular chart (operation 802). The computer system then identifies text for the section (operation 804). A determination is made as to whether the text fits within the polygon (operation 806).

The computer system displays the circular chart with the text in the section on a display system when the text fits within the polygon in the section (operation 808), with the process terminating thereafter. In this manner, the process graphically displays the data with the text in the circular chart which enables a desired level of comprehension of the data.

With reference again to operation 806, the computer system displays the text outside of the circular chart in the display system when the text does not fit within the polygon (operation 810). In operation 810, the text is displayed in one of a call out, a hover box, or some other graphical element. The process may be repeated for each section in the group of sections until all of the sections in the group of sections for the circular chart have been processed to display the circular chart.

Figure 9:
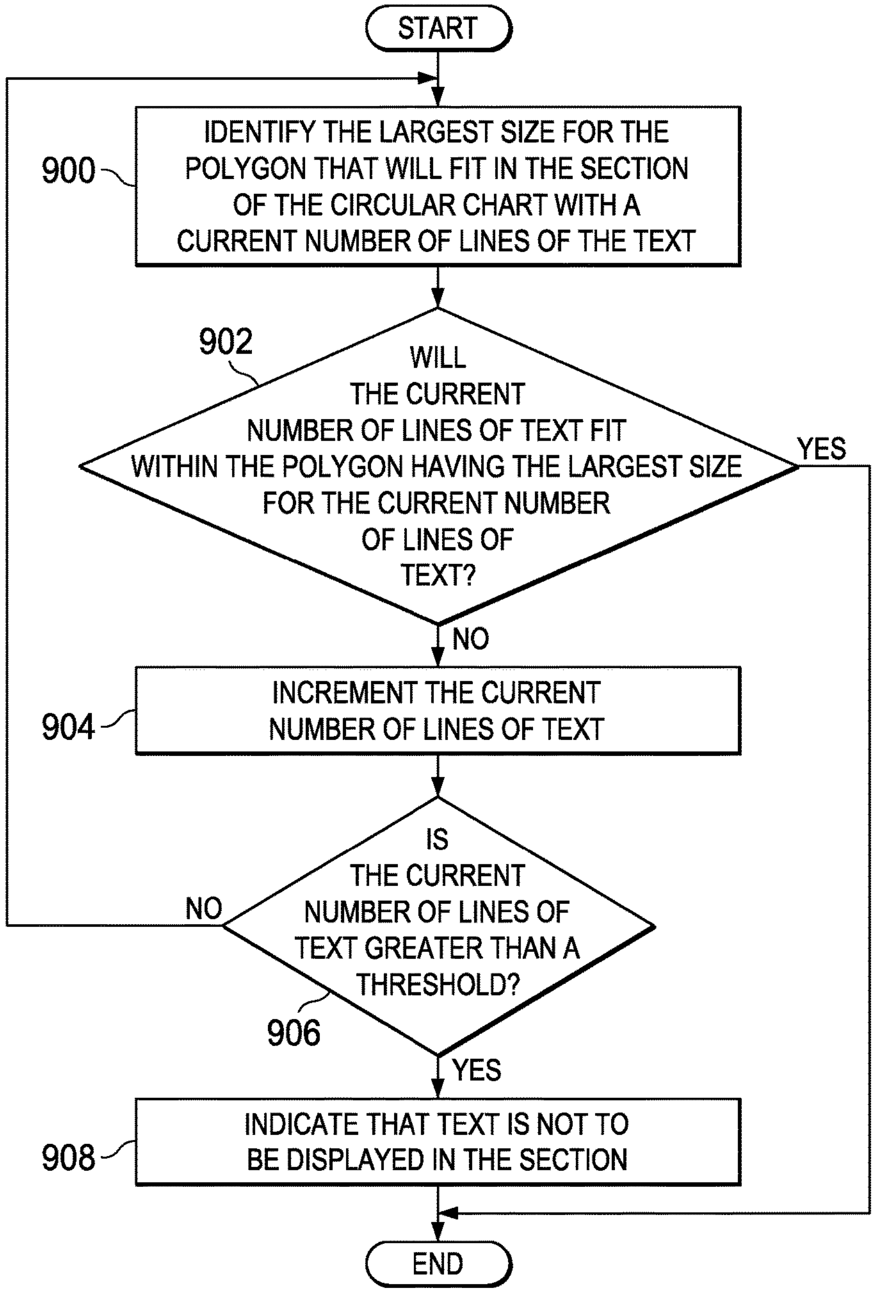
FIG. 9 is an illustration of a flowchart of a process for identifying a largest size for a polygon that will fit in a section of a circular chart in accordance with an illustrative embodiment.

Turning next to FIG. 9, an illustration of a flowchart of a process for identifying a largest size for a polygon that will fit in a section of a circular chart is depicted in accordance with an illustrative embodiment. The process illustrated in FIG. 9 is an example of an implementation for operation 802 in FIG. 8.

The process begins by identifying the largest size for the polygon that will fit in the section of the circular chart with a current number of lines of the text (operation 900). Part of operation 900 may include the process of identifying a centroid, an inner radius, and an outer radius for the section. The process may also identify an orientation for the section. The largest size for the polygon may then be identified in operation 900 based on the centroid, the inner radius, the outer radius, the orientation for the section, and the current number of lines of text.

The process determines whether the current number of lines of text will fit with in the polygon having the largest size for the current number of lines of text (operations 902). If the current number of lines of text does not fit in the polygon, the process increments the current number of lines of text (operation 904). A determination is made as to whether the current number of lines of text is greater than a threshold (operation 906). In operation 906, the threshold may be set to any number of lines of text. For example, it may be undesirable for aesthetic reasons to have more than 3 lines of text in a section. If the current number of lines of text is greater than the threshold indicates, then text is not to be displayed in the section (operation 908), with the process terminating thereafter.

With reference again to operation 906, if the current number of lines of text is not greater than the threshold, the process returns to operation 900. With reference again to operation 902, if the current number of lines of text fit within the polygon, the process terminates.

Figure 10:
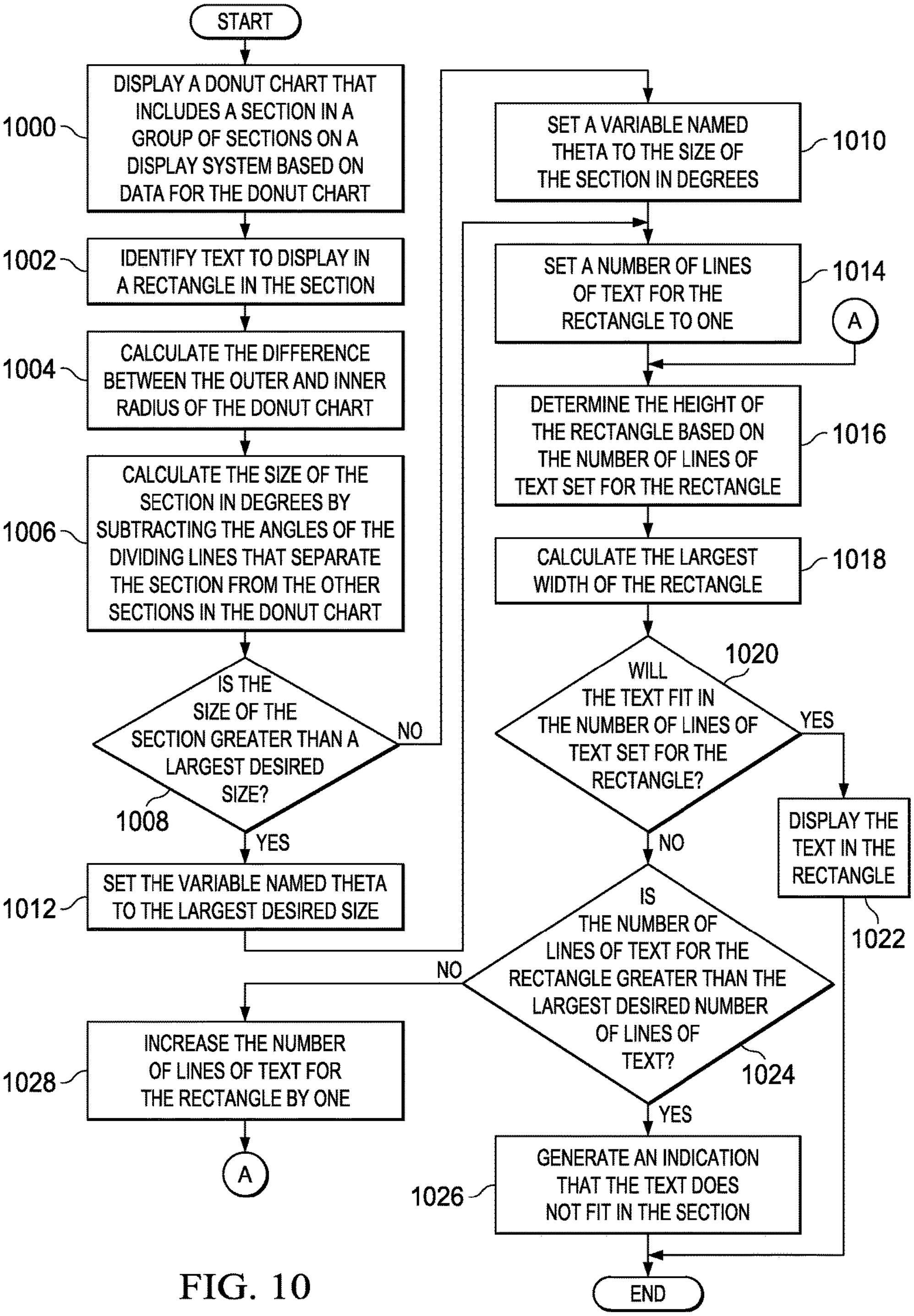
FIG. 10 is an illustration of a flowchart of a process for graphically displaying data in accordance with an illustrative embodiment.

Turning now to FIG. 10, an illustration of a flowchart of a process for graphically displaying data is depicted in accordance with an illustrative embodiment. The process illustrated in FIG. 10 may be implemented in circular chart environment 100 in FIG. 1. In particular, the process may be implemented in chart generator 102 to display data 118 with text 126 in donut chart 110 on display system 120 in computer system 106.

The process begins by displaying a donut chart that includes a section in a group of sections on a display system based on data for the donut chart (operation 1000). The process identifies text to display in a rectangle in the section (operation 1002).

The process next calculates the difference between the outer and inner radius of the donut chart (operation 1004). The process calculates the size of the section in degrees by subtracting the angles of the dividing lines that separate the section from the other sections in the donut chart (operation 1006).

A determination is made as to whether the size of the section is greater than a largest desired size (operation 1008). In operation 1008, the largest desired size for a section is selected from at least one of 64 degrees, 70 degrees, 90 degrees, or some other suitable limit. In these illustrative examples, 90 degrees is the theoretical limit for theta when using the law of cosines as the formula to determine the size of the rectangle. The largest size may be based on desired aesthetics for displaying a donut chart in these illustrative examples.

As depicted, when the size of the section is not greater than the largest desired size, a variable named theta is set to the size of the section in degrees (operation 1010). As also depicted, when the size of the section is greater than the largest desired size, the variable named theta is set to the largest desired size (operation 1012).

The process next sets the number of lines of text for the rectangle to one (operation 1014). The process determines the height of the rectangle based on the number of lines of text set for the rectangle (operation 1016). The process next calculates the largest width of the rectangle (operation 1018). The process makes a determination as to whether the text will fit in the number of lines of text set for the rectangle (operation 1020). As depicted, if the text will fit in the number of lines of text, the process displays the text in the rectangle (operation 1022), with the process terminating thereafter.

With reference again to operation 1020, if the text will not fit in the number of lines of text, the process makes a determination as to whether the number of lines of text for the rectangle is greater than the largest desired number of lines of text (operation 1024). The largest desired number of lines of text for the rectangle is at least one of 0, 1, 2, 3, or any other suitable number. When the largest desired number of lines of text for the rectangle is set to 0, text is not displayed in the section. The largest desired number of lines of text for the rectangle may also be set to the number of lines of text that fit in a rectangle having a largest height in the section. The largest desired number of lines of text may be 3. The largest desired number of lines of text may be based on desired aesthetics in displaying the donut chart.

As depicted, when the number of lines of text for the rectangle is greater than the largest desired number of lines of text, the process generates an indication that the text does not fit in the section (operation 1026), with the process terminating thereafter. With reference again to operation 1024, when the number of lines of text for the rectangle is fewer than the largest desired number of lines of text, the process increases the number of lines of text for the rectangle by one (operation 1028), with the process returning to operation 1016. The process may be repeated to display text for each section in the group of sections in the donut chart.

The flowcharts and block diagrams in each of the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

For example, the size of the polygons and the determination of whether text can fit in the polygons can be performed with the text for the sections being displayed in the circular chart after all of the sections have been processed. In another illustrative example, the operation for identifying the size of the sections based on the data also may be performed. These operations may be performed prior to the operations for displaying the text.

With reference to FIGS. 11-13, examples of program code for generating circular charts are depicted in accordance with an illustrative embodiment. The program code in these figures is shown using JavaScript. Illustration of this program code is not meant to limit the manner in which other illustrative examples may implement it. As used herein, program code may be in any suitable type of programming language for implementing the specified function or functions. For example, Java, C++, or other types of programming languages may be used.

Turning to FIG. 11, an illustration of program code for displaying text in a section of a circular chart based on the orientation of the section is depicted in accordance with an illustrative embodiment. As depicted, program code 1100 is an example of program code that may be used in chart generator 102 in FIG. 1. This program code may be run to display text within sections 114 for circular charts 104 in FIG. 1 based on the orientation for sections 114.

As depicted, program code 1100 includes initialization section 1102. In the illustrative example, initialization section 1102 includes instructions to set a variable named textWidth to the width in pixels of text for a variable named textItem. As depicted, textItem includes the text to be displayed in the section. The variable named arcBox is the rectangle where the text for the section will be displayed. As used herein, a pixel is the smallest addressable dot used in an image. For example, when a circular chart is 100 pixels wide by 100 pixels high, the circular chart has 10,000 addressable pixels.

In this illustrative example, initialization section 1104 sets the variable named bufferForColor to 30 pixels. As depicted, bufferForColor is used to reduce the maximum size of the rectangle where the text for the section will be displayed. The maximum size is reduced for aesthetic reasons. As also depicted, the variable named labelAngle is set to the angle of the section of the circular chart currently being processed using program code 1100. The angle of the section for the circular chart was determined in other program code before program code 1100 is used. As depicted, initialization section 1106 sets variables used by program code for displaying text in a section for a circular chart based on whether labelAngle is between 65 degrees and 115 degrees or 245 and 295 degrees.

Turning next to FIG. 12, an illustration of program code for displaying circular charts is depicted in accordance with an illustrative embodiment. As depicted, program code 1200 is an example of program code in chart generator 102 that may be run to display sections 114 for circular charts 104 in FIG. 1.

As depicted, program code 1200 includes max width calculation section 1202. In the illustrated example, max width calculation section 1202 includes instructions that identify the maximum width of a rectangle for a pie chart. As depicted, max width calculation section 1202 includes a variable named labelRadius used as the maximum height of the rectangle for the pie chart. In this illustrative example, labelRadius is set using the formula: (((radius of the pie chart*0.8)−(radius of the pie chart*0.35))/2). This formula may be replaced with the formula "0.225*radius of the pie chart" or some other suitable formula for determining the maximum height of the rectangle.

In this illustrative example, max width calculation section 1202 includes instructions that identify the maximum width of the rectangle. The instructions in max width calculation section 1202 use the law of cosines as a formula to calculate the maximum width of the rectangle.

In this illustrative example, program code 1200 includes section 1204. As depicted, section 1204 includes instructions that loop through each section of the pie chart and calls program code that displays text in the section.

With reference now to FIG. 13, an illustration of program code for displaying text in a section for a circular chart is depicted in accordance with an illustrative embodiment. As depicted, program code 1300 is an example of program code in chart generator 102 that may be run to display lines 132 of text 126 within sections 114 of circular charts 104 in FIG. 1.

As depicted, program code 1300 includes section 1302. Section 1302 includes instructions that split text for a section of a circular chart into a number of lines of text within a rectangle in the section. The rectangle may or may not be displayed based on aesthetic preferences. As depicted, section 1302 includes instructions that will hide the text if the text will not fit within the rectangle.

Figure 14:
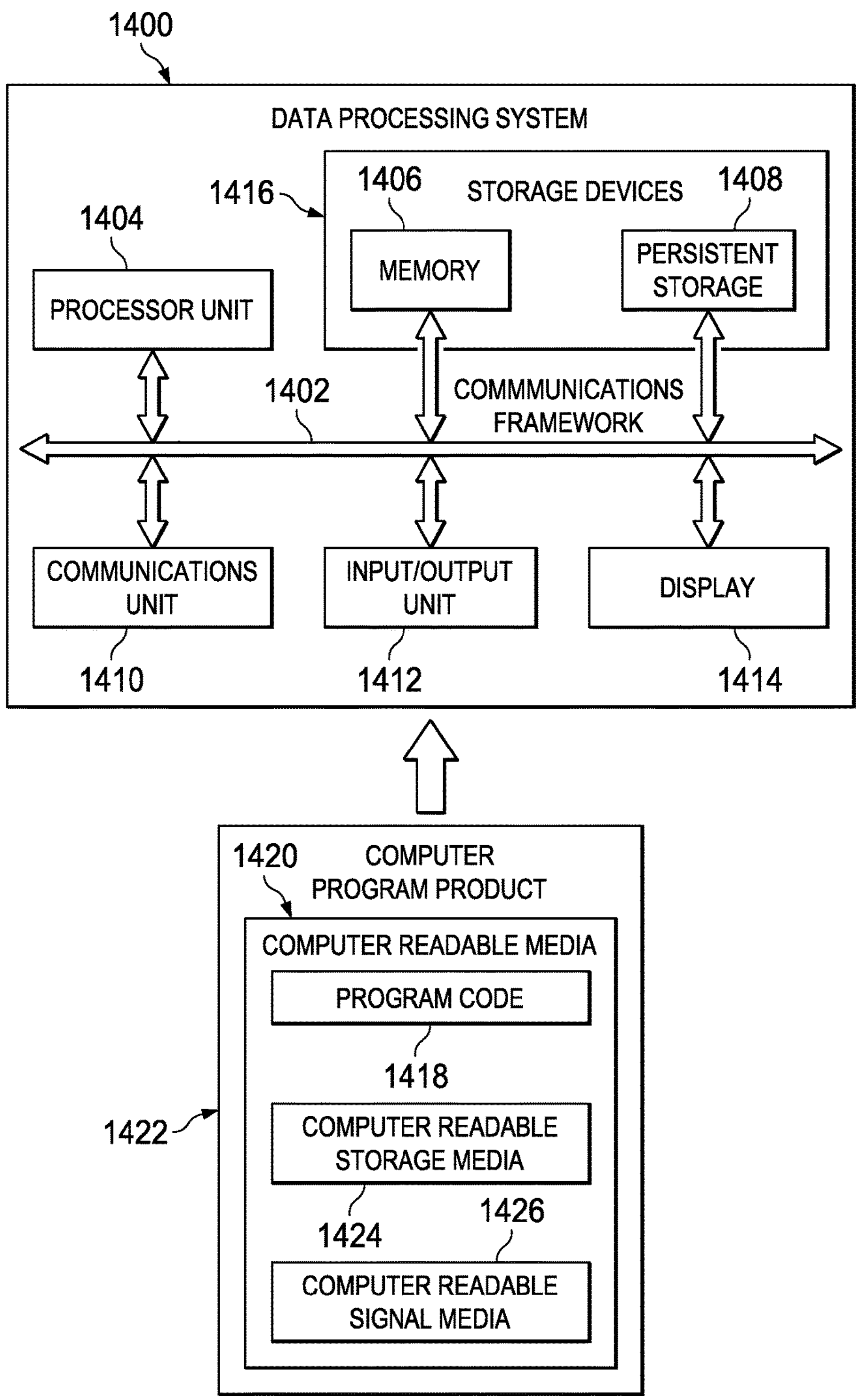
FIG. 14 is an illustration of a block diagram of a data processing system in accordance with an illustrative embodiment.

Turning now to FIG. 14, an illustration of a block diagram of a data processing system is depicted in accordance with an illustrative embodiment. Data processing system 1400 may be used to implement data processing devices in computer system 106 in FIG. 1. In this illustrative example, data processing system 1400 includes communications framework 1402, which provides communications between processor unit 1404, memory 1406, persistent storage 1408, communications unit 1410, input/output (I/O) unit 1412, and display 1414. In this example, communications framework 1402 may take the form of a bus system.

Processor unit 1404 runs instructions for software that may be loaded into memory 1406. Processor unit 1404 may be a number of processors, a multi-processor core, or some other type of processor, depending on the particular implementation.

Memory 1406 and persistent storage 1408 are examples of storage devices 1416. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1416 may also be referred to as computer readable storage devices in these illustrative examples. Memory 1406, in these examples, may be, for example, a random access memory or any other suitable volatile or non-volatile storage device. Persistent storage 1408 may take various forms, depending on the particular implementation.

For example, persistent storage 1408 may contain one or more components or devices. For example, persistent storage 1408 may be a hard drive, a flash memory, a rewritable optical disk, a rewritable magnetic tape, or some combination of the above. The media used by persistent storage 1408 also may be removable. For example, a removable hard drive may be used for persistent storage 1408.

Communications unit 1410, in these illustrative examples, provides for communications with other data processing systems or devices. In these illustrative examples, communications unit 1410 is a network interface card.

Input/output unit 1412 allows for input and output of data with other devices that may be connected to data processing system 1400. For example, input/output unit 1412 may provide a connection for user input through at least one of a keyboard, a mouse, or some other suitable input device. Further, input/output unit 1412 may send output to a printer. Display 1414 provides a mechanism to display information to a user.

Instructions for at least one of the operating system, applications, or programs may be located in storage devices 1416, which are in communication with processor unit 1404 through communications framework 1402. The processes of the different embodiments may be performed by processor unit 1404 using computer-implemented instructions, which may be located in a memory, such as memory 1406.

These instructions are referred to as program code, computer usable program code, or computer readable program code that may be read and executed by a processor in processor unit 1404. The program code in the different embodiments may be embodied on different physical or computer readable storage media, such as memory 1406 or persistent storage 1408.

Program code 1418 is located in a functional form on computer readable media 1420 that is selectively removable and may be loaded onto or transferred to data processing system 1400 for execution by processor unit 1404. Program code 1418 and computer readable media 1420 form computer program product 1422 in these illustrative examples. In one example, computer readable media 1420 may be computer readable storage media 1424 or computer readable signal media 1426. In these illustrative examples, computer readable storage media 1424 is a physical or tangible storage device used to store program code 1418 rather than a medium that propagates or transmits program code 1418.

Alternatively, program code 1418 may be transferred to data processing system 1400 using computer readable signal media 1426. Computer readable signal media 1426 may be, for example, a propagated data signal containing program code 1418. For example, computer readable signal media 1426 may be at least one of an electromagnetic signal, an optical signal, or any other suitable type of signal. These signals may be transmitted over at least one of communications links, such as wireless communications links, optical fiber cables, coaxial cables, wires, or any other suitable types of communications links.

The different components illustrated for data processing system 1400 are not meant to provide architectural limitations to the manner in which different embodiments may be implemented. The different illustrative embodiments may be implemented in a data processing system including components in addition to or in place of those illustrated for data processing system 1400. Other components shown in FIG. 14 can be varied from the illustrative examples shown. The different embodiments may be implemented using any hardware device or system capable of running program code 1418.

The description of the different illustrative embodiments has been presented for purposes of illustration and description, and is not intended to be exhaustive or limited to the embodiments in the form disclosed. Many modifications and variations will be apparent to those of ordinary skill in the art.

The different illustrative examples describe components that perform actions or operations. In an illustrative embodiment, a component is configured to perform the action or operation described. For example, the component may have a configuration or design for a structure that provides the component with an ability to perform the action or operation that is described in the illustrative examples as being performable by the component.

Further, different illustrative embodiments may provide different features as compared to other desirable embodiments. The embodiment or embodiments selected are chosen and described in order to best explain the principles of the embodiments, the practical applications, and to enable others of ordinary skill in the art to understand the disclosure for various embodiments with various modifications as are suited to the particular uses contemplated.

What is claimed is:

1. A method for graphically displaying data, the method comprising:

selecting, by a computer system, a section from a group of sections in a circular chart for the data that is to be graphically displayed on a display system;

identifying, by the computer system, a section centroid, an inner radius, an outer radius, and an orientation for the section;

identifying, by the computer system, text for the section and a current number of lines of the text;

identifying, by the computer system, a largest size for a polygon centered over the section centroid that will fit in the section of the circular chart by:

identifying, by the computer system, a first dimension of the polygon based on the current number of lines of the text for display in the section;

identifying, by the computer system, a maximum second dimension of the polygon by:

identifying a central angle for the section; and based on the first dimension of the polygon, the section centroid, the inner radius, the outer radius, the central angle for the section, and the orientation for the section, using the law of cosines to identify the maximum second dimension of the polygon; and when the current number of lines of the text does not fit within the polygon having the first dimension and the second dimension, incrementing the current number of lines of the text and repeating the identifying of the largest size for the polygon after incrementing the current number of lines of the text; and displaying, by the computer system, the circular chart with the text in the section on the display system when the text fits within the polygon in the section.

2. The method of claim 1 further comprising:

displaying the text outside of the circular chart in the display system when the text does not fit within the polygon.

3. The method of claim 2, wherein the text is displayed in a hover box.

4. The method of claim 1 further comprising:

repeating, for each section in the group of sections, the steps of identifying, by the computer system, the largest size for the polygon that will fit in the section of the circular chart;

identifying, by the computer system, the text for the section; displaying, by the computer system, the circular chart with the text in the section on the display system when the text fits within the polygon in the section.

5. The method of claim 1, wherein the polygon is a rectangle and wherein identifying the largest size for the polygon comprises:

identifying a height of the rectangle based on a current number of lines of the text for the rectangle for displaying the text in the rectangle in the section on the display system when the text fits within the current number of lines of the text; and identifying a maximum width of the rectangle based on the height of the rectangle, the centroid, the inner radius, the outer radius, and the orientation for the section.

6. The method of claim 1, wherein the circular chart is selected from one of a donut chart and a pie chart.

7. The method of claim 1, wherein the polygon is selected from one of a square, a rectangle, a trapezoid, a quadrilateral, a pentagon, and a hexagon.

8. A computer system comprising:

a display system;

a hardware processor; and a chart generator in a computer system in communication with the display system and the hardware processor, wherein:

the chart generator selects a section from a group of sections in a circular chart for data that is to be graphically displayed on the display system;

identifies a section centroid, an inner radius, an outer radius, and an orientation for the section;

identifies text for the section and a current number of lines of the text;

identifies a largest size for a polygon centered over the section centroid that will fit in the section of the circular chart such that the chart generator:

identifies a first dimension of the polygon based on the current number of lines of the text for display in the section;

identifies a maximum second dimension of the polygon by:

identifying a central angle for the section; and based on the first dimension of the polygon, the section centroid, the inner radius, the outer radius, the central angle for the section, and the orientation for the section, using the law of cosines to identify the maximum second dimension of the polygon; and when the current number of lines of the text does not fit within the polygon having the first dimension and the second dimension, incrementing the current number of lines of the text and repeating the identifying of the largest size for the polygon after incrementing the current number of lines of the text; and displays the circular chart with the text in the section on the display system when the text fits within the polygon in the section.

9. The computer system of claim 8, wherein the chart generator displays the text outside of the circular chart in the display system when the text does not fit within the polygon.

10. The computer system of claim 9, wherein the text is displayed in a hover box.

11. The computer system of claim 8, wherein the chart generator repeats, for each section in the group of sections, identifying the largest size for the polygon that will fit in the section of the circular chart; identifying the text for the section; displaying the circular chart with the text in the section on the display system when the text fits within the polygon in the section.

12. The computer system of claim 8, wherein the polygon is a rectangle and wherein in identifying the largest size for the rectangle, the chart generator identifies a height of the rectangle based on a current number of lines of the text for the rectangle for displaying the text in the rectangle in the section on the display system when the text fits within the current number of lines of the text; and identifies a maximum width of the rectangle based on the height of the rectangle, the centroid, the inner radius, the outer radius, and the orientation for the section.

13. The computer system of claim 8, wherein the chart generator is located in a first computer in the computer system and the display system is located in a second computer in the computer system.

14. A computer program product comprising:

a non-transitory computer readable storage media;

program code, stored on the computer readable storage media, for selecting a section from a group of sections in a circular chart for data that is to be graphically displayed on a display system;

program code, stored on the computer readable storage media, for identifying a centroid, an inner radius, an outer radius, and an orientation for the section;

program code, stored on the computer readable storage media, for identifying text for the section and a current number of lines of the text;

program code, stored on the computer readable storage media, for identifying a largest size for a polygon centered over the centroid that will fit in the section of the circular chart such that the second program code:

identifies a first dimension of the polygon based on the current number of lines of the text for display in the section;

identifies a maximum second dimension of the polygon by:

identifying a central angle for the section; and based on the first dimension of the polygon, the section centroid, the inner radius, the outer radius, the central angle for the section, and the orientation for the section, using the law of cosines to identify the maximum second dimension of the polygon; and when the current number of lines of the text does not fit within the polygon having the first dimension and the second dimension, incrementing the current number of lines of the text and repeating the identifying of the largest size for the polygon after incrementing the current number of lines of the text; and program code, stored on the computer readable storage media, for displaying the circular chart with the text in the section on the display system when the text fits within the polygon in the section.

15. The computer program product of claim 14, wherein the polygon is a rectangle and wherein the program code for identifying the largest size for the polygon comprises:

program code for identifying a height of the rectangle based on a current number of lines of the text for the rectangle for displaying the text in the rectangle in the section on the display system when the text fits within the current number of lines of the text; and program code for identifying a maximum width of the rectangle based on the height of the rectangle, the centroid, the inner radius, the outer radius, and the orientation for the section.

16. The method of claim 2, wherein the text is displayed in a call out.

17. The computer system of claim 9, wherein the text is displayed in a call out.

* * * * *